Sept. 19, 1961 F. C. WINKLER ET AL 3,001,062
LIGHT REFRACTOR
Filed Sept. 15, 1955 3 Sheets-Sheet 1

WITNESSES
Robert C. Baird
Wm. B. Sellers

INVENTORS
Frederic C. Winkler &
Nick Stuffer.
BY
Arthur T. Stratton
ATTORNEY

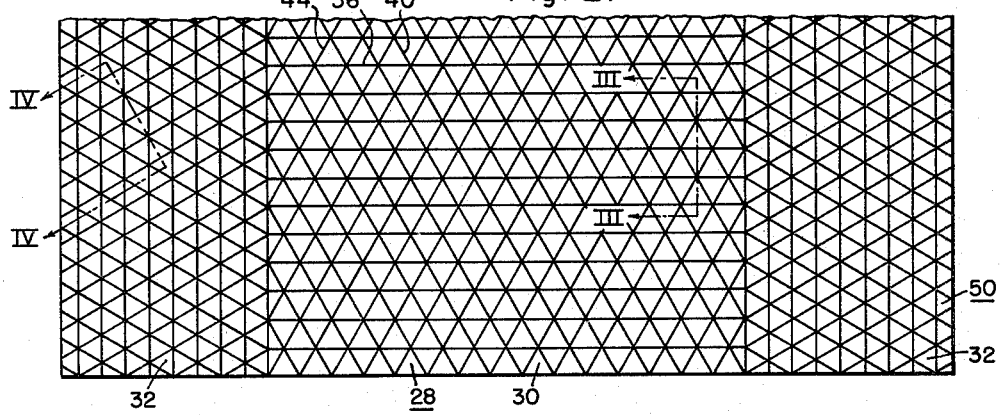
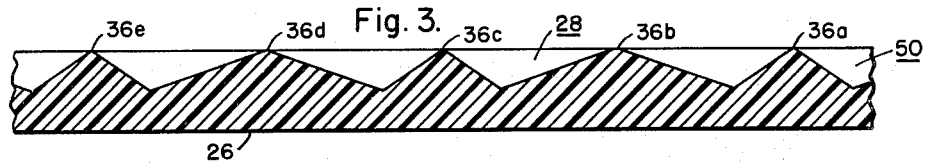
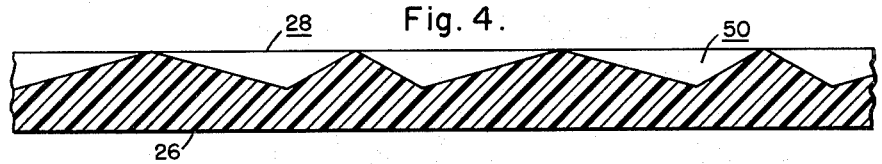
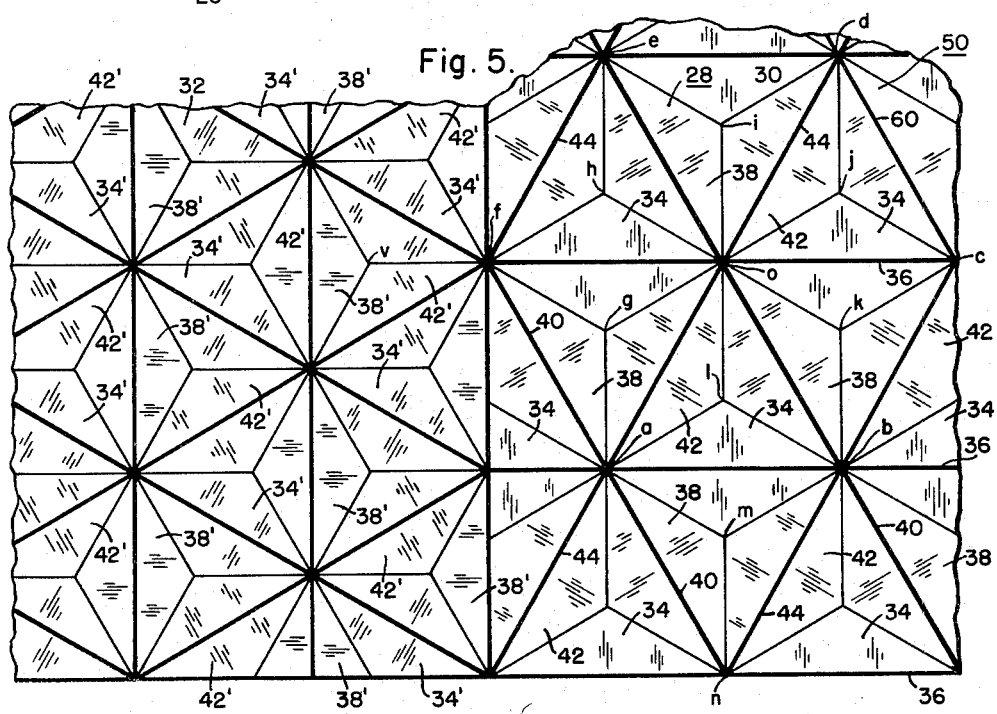

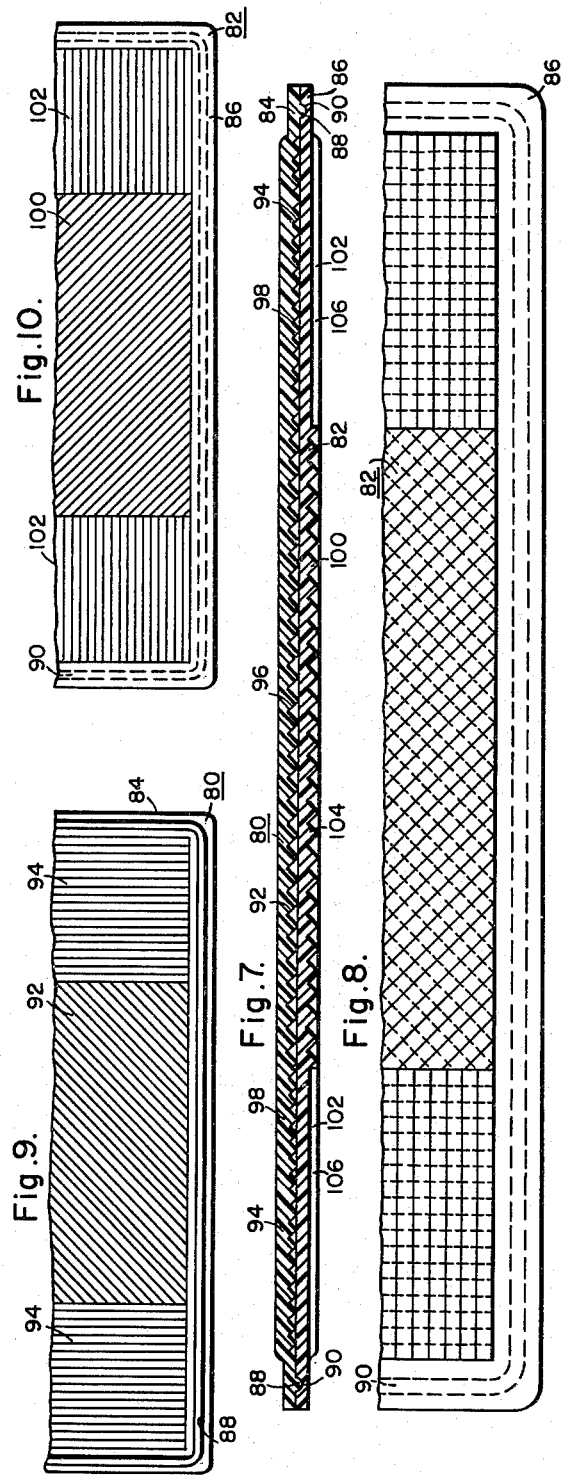
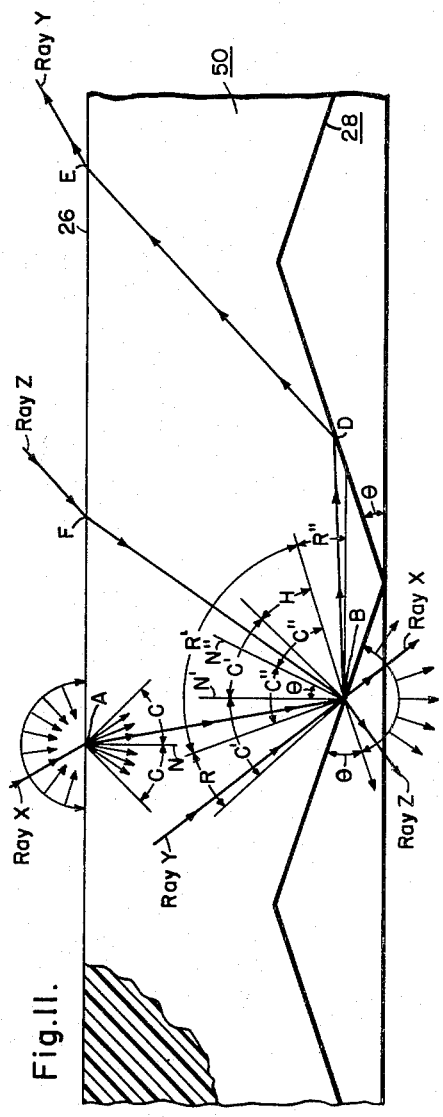

United States Patent Office 3,001,062
Patented Sept. 19, 1961

3,001,062
LIGHT REFRACTOR
Frederic C. Winkler, Cleveland, Ohio, and Nick Stuffer, Vicksburg, Miss., assignors to Westinghouse Electric Corporation, East Pittsburgh, Pa., a corporation of Pennsylvania
Filed Sept. 15, 1955, Ser. No. 534,526
1 Claim. (Cl. 240—106)

Our invention relates to lighting fixtures and more particularly to a means for controlling the light distribution from a lighting fixture.

As is well known, an adequate quantity of light alone does not insure good illumination. To obtain illumination which will not cause undue eye strain or fatigue, it is necessary to obtain a uniform distribution of light and to limit the brightness of the light source. Such a problem is particularly acute when luminaires are used which are located close to the ceiling or recessed in the ceiling and which utilize elongated light sources, which emit light rays throughout their entire length at high angles to the vertical below the horizontal plane of the ceiling and which thus normally fall within the peripheral field of vision. The brightness level and light distribution of such fixtures can be controlled in various well known manners such as by the use of louvers or glass diffusing panels located below the light source. In order to obtain a higher degree of light control, panels or lenses have been provided having a multiplicity of prisms which are usually located on the outer or emergent surface of the panel, which prisms control the direction of light rays emerging from the panel. Heretofore, such prismatic panels have not been entirely satisfactory as the prisms have either been spaced from each other so that the portions of the panel between the prisms constitute spaced high intensity light areas, or they have had a prism arrangement which did not uniformly distribute light or provide a uniform panel brightness level from all angles of observation. Also, some of such prismatic panels have employed small spaced prisms which project outwardly from the lower surface of the panel so that the panel has been difficult to clean where cleanliness is necessary to retain the efficiency of the panel. Such prismatic panels have been also unsatisfactory in that such projecting prisms do not offer any cross bracing to the panel thereby requiring that the panel be of an increased thickness in order to be self-supporting.

Accordingly, one object of our invention, generally speaking, is to provide a new and improved uniform, low brightness prismatic lens panel for a lighting fixture.

Another object of our invention is to provide a new and improved low brightness prismatic lens panel for a lighting fixture having rows of prisms disposed to cross brace the panel.

Another object of our invention is to provide a new and improved low brightness prismatic lens panel which transmits light so as to obtain a uniform distribution therefrom.

A more specific object of our invention is to provide a new and improved low brightness prismatic lens panel in which all of the emergent surface of the panel constitutes a face of a prism.

Another more specific object of our invention is to provide a new and improved prismatic lens panel for a lighting fixture having elongated prisms in which the outer edges of some prisms are in alignment so as to extend between the sides of the panel to cross brace the panel.

Another object of our invention is to provide a new and improved prismatic lens panel for a lighting fixture having a plurality of elongated prisms of which all the outer edges are located in the bottom plane of the panel so that no sharp protrusions are obtained on the lens panel.

Another more specific object of our invention is to provide a new and improved prismatic lens panel for a lighting fixture comprising a plurality of intersecting rows of elongated prisms.

Another object of our invention is to provide a new and improved low brightness prismatic lens panel for a lighting fixture utilizing a minimum of material which is self-supporting.

Another object of our invention is to provide a new and improved low brightness prismatic lens panel for a lighting fixture which may be inexpensively produced and maintained.

Another more specific object of our invention is to provide a new and improved low brightness prismatic lens panel for a lighting fixture which has an improved light distribution regardless of the lamp position above the lens panel.

Another object of our invention is to provide a new and improved low brightness prismatic lens panel which is a uniform design so as to be capable of being utilized in any size.

These and other objects of our invention will become more apparent upon consideration of the following detailed description of preferred embodiments thereof, when taken in conjunction with the attached drawings, in which:

FIG. 2 is a schematic bottom plan view of one end of a prismatic lens panel constructed in accordance with the principles of our invention;

FIG. 3 is a cross-sectional view of a portion of the lens panel shown in FIG. 2 taken substantially along the lines III—III thereof;

FIG. 4 is a cross-sectional view of a portion of the lens panel shown in FIG. 2 taken substantially along the lines IV—IV thereof;

FIG. 5 is an enlarged bottom plan view of a portion of the lens panel as shown in FIG. 2;

FIG. 7 is a cross-sectional view of a composite lens panel constructed in accordance with the principles of our invention;

FIG. 8 is a bottom plan view of a part of the composite lens panel as shown in FIG. 7;

FIG. 9 is a bottom plan view of a part of the upper panel of the composite panel shown in FIG. 7;

FIG. 10 is a bottom plan view of the lower panel of the composite panel shown in FIG. 7; and FIG. 11 is an enlarged cross-sectional view of a prism utilized in the lens panel as shown in FIG. 2 illustrating the optics thereof.

While the invention is herein specifically disclosed as employed in a fluorescent lighting fixture which is recessed in a ceiling, it should be understood that the invention in its various aspects may be utilized in other type of luminaires and with other types of lighting sources than that specifically herein disclosed. Consequently, the following disclosure is not intended to be limiting with respect to the type of light source or fixture utilized with a lens panel constructed in accordance with our invention.

Figure 1:
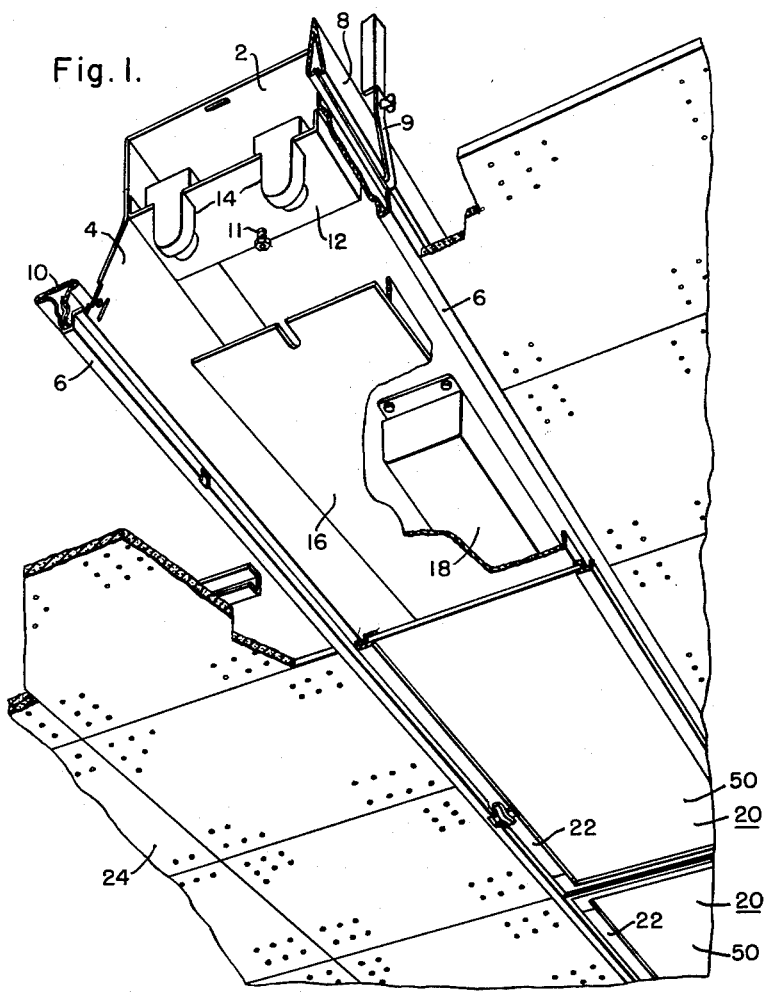
FIGURE 1 is a perspective, partially exploded view of a lighting fixture and ceiling structure, which fixture is adapted to use a prismatic lens panel constructed in accordance with the principles of our invention, and which fixture has portions broken away to more clearly show the structure thereof.

The lighting fixture shown in FIG. 1 comprises an elongated housing 2 having downwardly extending side walls 4 which are provided at their lower edge with a flange 6 of well-known configuration whereby the housing 2 may be supported from the ceiling by various well-known supporting means, such as an elongated side support 8 or a T bar 10 engaging the flanges 6 and which are supported by a suitable strap 9. A support plate 12 is secured to each side wall 4 so as to extend laterally therebetween at a point intermediate the side walls 4. As shown, a pair of laterally spaced lamp holders 14 are secured to support plate 12 between side walls 4 in any suitable manner, not shown, which are of a type to receive and support one end of an elongated fluorescent lamp, not shown. Inasmuch as such lamps must be supported at each of their ends, another support plate 12 and pair of lamp holders 14 are spaced longitudinally inwardly of housing 2 a distance so as to readily receive a standard length fluorescent lamp therebetween. Support plates 12 are also provided with suitable means, such as a screw and nut assembly 11, so that an elongated reflector 16 may extend therebetween so as to define an upper chamber in housing 2 in which various electrical components, such as a ballast 18 may be located. Lamp holders 14 have their lower end located below reflector 16 so that the lamps are also located below reflector 16. Flanges 6 are also provided with suitable means whereby an elongated door member 20 may be secured thereto below the lamps. Door member 20 comprises a frame 22 in which is secured an elongated rectangular light control panel 50 which is constructed in accordance with the principles of our invention. As also shown, this assembly is adapted to be located in a ceiling 24 of well-known construction, such as an acoustic tile ceiling. The construction of the above-described lighting fixture except for the panel 50 does not constitute a part of our invention and, accordingly, need not be more particularly described. For a more complete description of such a fixture, reference is made herein to the copending application Serial No. 348,666, filed April 14, 1953, now Patent No. 2,852,663, issued September 16, 1958, entitled," "Luminaires" by N. Stuffer and L. H. Seeley wherein such construction has been more particularly shown, described and claimed, and which has been assigned to the same assignee as this invention.

Panel 50 is fabricated from any suitable light transmitting material, such as glass, and is preferably fabricated from a plastic material, such as methacrylate, because of its optical clarity and its light weight, and because it may be provided with the hereinafter described prismatic structure on a production basis by any suitable molding process, such as by injection molding. As shown in FIGS. 2 to 5, panel 50 is provided with one smooth side 26 which extends the entire length and width of panel 50, and a figured side 28 which is laterally spaced from the smooth side 26 and which also extends the entire length and width of panel 50. Side 28 of panel 50 is divided into a figured central portion 30 having a figured side portion 32 at each of its sides.

Central portion 30 of panel 50 is provided with a plurality of elongated prisms each of which has a pair of divergent sloping faces which extend inwardly of panel 50 from an elongated outer edge. The outer edge of each prism is located outermost from side 26 of panel 50 and is approximately parallel thereto. As shown, the various prisms are arranged in a definite pattern to obtain the desired distribution of light, and it will be noted that a number of prisms have been provided which are joined in end-to-end relationship so that their joined outer edges form a single straight line extending substantially perpendicular between the side portions 32 of panel 50. Such perpendicularly extending outer edge line has been identified by the numeral 36 and the joined prisms forming such outer edge lines 36 have been identified by the numeral 34. It will further be noted that a number of parallel rows of prisms 34 have been provided so that an equal number of outer edge lines 36 are provided which are parallel to each other. As will become more apparent hereinafter, each edge line 36 is perpendicularly spaced an equal distance from adjacent edge lines 36 and that such spacing bears a definite relationship to the length of prisms 34. Thus, prisms 34, in the spaced rows of prisms 34, divide the center portion 30 of panel 50 into a number of areas extending perpendicularly between the side portions 32 of panel 50. Also, the prisms 34 in each row of prisms 34 are displaced longitudinally with respect to the prisms 34 in each adjacent row of prisms 34 a distance equal to one-half the length of the outer edge of each prism 34, so that the joined ends of the outer edges of any two prisms 34 in one row of prisms 34, are located on the perpendicular bisector of an outer edge of a prism 34 in each adjacent row of prisms 34.

The central portion 30 of panel 50 is also provided with a plurality of rows of elongated prisms 38 which are substantially identical to prisms 34 so as to form a plurality of parallel edge lines 40 which extend angularly with relation to edge lines 36. As shown, each of the opposite ends of the outer edge of each prism 38 coincides with the junction point of the outer edges of two adjacent prisms 34 in the adjacent row of prisms 34. Each edge line 40 traverses each edge line 36 so as to be located in the second and fourth quadrants with respect to a line perpendicular to edge lines 36, with the edge lines 36 being considered as the horizontally extending X axis.

In a similar manner, central portion 30 of panel 50 is provided with a plurality of parallel rows of elongated prisms 42 which are substantially identical to prisms 34 and 38 so as to form a plurality of parallel edge lines 44. Prisms 42 are located so as to extend angularly with respect to both the prisms 34 and the prisms 38, with each end of the outer edge line of each prism 42 coinciding with and integrally joined to the junction point of the outer edges of adjacent prisms 34 and 38. Edge lines 44 traverse edge lines 36 so as to be located in the first and third quadrants with respect to a line perpendicular to edge lines 36, with the edge lines 36 being considered as the horizontally extending X axis. Edge lines 36, 40 and 44 are all located in the same plane, and as prisms 34, 38 and 42 are substantially identical to each other, their outer edges are equal in length and form a triangle which is obviously an equilateral triangle. Accordingly, each edge line 36, 40 and 44 makes an angle of 60° with each adjacent edge line 36, 40 or 44.

Referring to FIG. 5, it will be noted that the outer edge of each prism 34 may be considered as constituting the base of such an equilateral triangle and the outer edge line of prisms 38 and 42 may be considered as constituting the side of such an equilateral triangle. Such construction divides the area between adjacent edge lines 36 into a plurality of adjacent equilateral triangles which have a common side and their apexes facing in opposite directions (see FIG. 2). For convenience in describing our invention, the junction points of some of these equilateral triangles have been identified by the letters a, b, c, d, e, f, n and o.

Thus, referring to triangles abo and abn, it will be noted that the outer edge ab of one prism 34 forms the common base of a pair of such equilateral triangles which extend in opposite directions from the base outer edge ab, so as to form a rhombus oanb. Each parallel side of rhombus oanb is formed by the outer edge lines of spaced prisms 38 or 42 in adjacent rows of prisms 38 or 42. Thus, parallel sides an and ob are formed by the outer edge lines of spaced prisms 38 in adjacent rows of prisms 38. Similarly, sides ao and nb are formed by the outer edge lines of prisms 42. Each side of rhombus oanb also forms a side of another identical rhombus. Thus, for example, side ao is also a side of rhombus aoef and side bo is also a side of rhombus bodc. Rhombus aoef and rhombus bodc also have a common junction point o at which opposite ends of their respective short diagonals of and oc are joined. Diagonals of and oc are the outer edges of a pair of prisms 34 which are in tandem with each other and are in a straight line, which line is the outer edge line 36 adjacent the outer edge line 36 in which outer edge ab is located. This geometric interrelationship is repeated as desired for both the length and width of central portion 30 of panel 50 to obtain the particular size panel 50 desired.

Although for convenience in discussion, prisms 34 have been considered as the diagonals of the various particular rhombuses described, it should be realized that such description has been for convenience only and that if desired the same construction of central portion 30 of panel 50 could be described by utilizing any prism 34, 38 or 42 as the diagonal of a rhombus.

FIG. 5 also illustrates that each of the equilateral triangles, formed by the outer edge lines of prisms 34, 38 and 42, has a face of each of the prisms sloping inwardly from the outer edge line of the prism toward the center of the equilateral triangle but displaced inwardly of panel 50 toward the side 26. As can be appreciated, as prisms 34, 38 and 42 are formed substantially identical to each other, the intersection of the faces of each of the prisms within an equilateral outer edge triangle occurs at the center of the equilateral triangle, some of which centers have been identified as g, h, i, j, k, l and m. As intersections g to m are at the center of the various equilateral triangles, it will be obvious that each prism face within an equilateral outer edge triangle forms an isosceles triangle extending angularly inwardly of panel 50 from the outer edge line of a prism. Thus, in the equilateral triangle aob, sides al, ol and bl of each prism face are all of equal length. It will be appreciated that the length of the lines al, bl and ol may be varied depending on the cut off angle desired, as hereinafter described.

The particular optical properties of various types of prisms have been well known for years and, accordingly, no claim is made herein to the mere use of an elongated prism per se for light control purposes. (See for example, chapter V of James P. C. Southall's textbook on geometrical optics, entitled "Mirrors, Prisms and Lenses.") In order to better understand the operation of lens panel 50, FIG. 11 illustrates the manner in which light rays are controlled by means of a single prism on a light transmitting panel which has a flat upper surface located below a source of light, and which has an index of refraction greater than the air surrounding each side of the panels 50. Although only one prism is shown in FIG. 11, it is to be realized that such prism is representative of any prism on panels 50.

As is well known, a given point A on the side 26 of panel 50 facing the light source will receive light from all directions, which is illustrated as a semicircular section in the plane of the drawing. Except for some surface reflection by side 26, such light rays will enter the panel 50 which, due to the increased optical density will cause the light rays entering panel 50 to be deviated towards the normal N which extends perpendicularly to the side 26 through point A. The degree of such deviation, that is, the angle the refracted light rays makes with the normal, is characteristic of the optical properties of panel 50 with relation to the upper air space. The maximum value that the angle of refraction can have is commonly referred to as the critical angle and which has been identified by the letter C. Thus, all the light rays within the panel 50 will be within a sector of panel 50 equal to twice the critical angle C having its apex at A. Similarly, at any point B on the lower face of any prism, all the light rays within the panel 50 will be directed to a sector which is equal to the sector defined by the adjacent critical angles. Such sector at point B will lie within the adjacent critical angles C' at each side of a normal N' parallel to normal N extending through point B. As the material of panel 50 does not vary in its optical density to any appreciable degree, it will be obvious that the critical angles C' are equal to the critical angles C.

The number and direction in which the light rays impinging upon point B will be transmitted outwardly from panel 50 is determined by the optical properties of the panel 50 and the air space below panel 50. As shown, the point B is located on the face of a prism which extends angularly upwardly into panel 50, and in the converse manner to that previously described, the light rays upon emerging from the face of the panel 50 at point B will be directed away from the normal N'' extending perpendicularly to the outer sloping surface of the prism, as the air space below panel 50 has a lower optical density than the material of panel 50. The adjacent critical angles indicated as C'' at each side of normal N'' having their apexes at point B determine the entire sector within panel 50 in which light must be received with reference to point B in order to be transmitted outwardly from panel 50 at point B. Again, as the optical density of panel 50 does not materially vary, the critical angle C'' will be equal to the critical angles C and C'. Thus, only light in the sector which is the total of the two critical angles C'', and which has been identified as R', will be transmitted through panel 50. Any light rays beyond such sector R', such as in sectors R and R'', will be reflected into panel 50 by the lower sloping surface of the prism, for example, ray Y. Thus, the index of refraction with reference to a light ray leaving air and entering the panel 50 will determine the direction the light rays within panel 50 will impinge upon point B (that is, the adjacent initial angles C'), and the index of refraction of a light ray leaving panel 50 with relation to the lower air space will determine what light rays within panel 50 will be transmitted outwardly beyond point B (that is, the adjacent critical angles C''). However, as the normals N or N' and N'' are displaced by an angle θ, equal to the angle the face of the prism makes with the horizontal, the sector of the combined critical angles C'' is displaced through the same angle θ with respect to the combined critical angles C'' which lies outside the combined critical C' do not completely overlap the combined angles C''. As such critical angles do not completely overlap, two effects are produced; (1) light rays passing through the sector R and R'' which lie outside the combined critical angles C'' are reflected by the prism upwardly into the panel 50, and (2) a segment H exists in the combined critical angles C'' which lie outside the combined critical angles C' so that no light is received in segment H, and, accordingly, no light is transmitted from the panel 50 outwardly in the region controlled by segment H. In the drawing, the angle φ represents the prismatic cutoff angle in which region no light is transmitted.

It, of course, is to be realized that light rays from segment R may be reflected at point B so as to impinge on the other face of the prism such as point D and be reflected upwardly into panel 50. Other rays, not shown, may be reflected at point B so as to entirely avoid striking the other side of the prism. Some of such reflected rays may in turn be reflected at the upper surface 26 of panel 50, such that they will pass through the segment H in which event some secondary transmission of light may occur through point B so as to pass outwardly of panel 50 in the region of the prismatic cutoff angle φ. Such, of course, will occur as the segment H is within the combined critical angles C''. Such secondary transmission by reflected rays can, however, be controlled to a large extent by the design of the prisms on panel 50 so that they do not represent any substantial amount of light transmission and are not objectionable for our purposes.

In view of the optics of a sloping face of a prism, it will be understood that each face of each prism 34, 38 and 42 will have a cutoff angle which is diametrically opposed from that of the other face so that the brightness of panel 50 will be reduced in two diametrically opposed directions by each prism 34, 38 and 42. As each prism 34 is angularly disposed with relation to each prism 38 and 42, the cutoff angles of prisms 34 will not extend in the same direction as the cutoff angles of prisms 38 and 42. The same applies equally to each prism 38 and 42 as applied to prisms 34 and 42, and 34 and 38, respectively. In particular, it will be noted that in rhombus *oanb*, faces *obl* and *anm* of spaced prisms 38 exercise such cutoff in opposite directions, faces *alo* and *nmb* of spaced prisms 42 exercise such cutoff in opposite directions, faces *alb* and *amb* of prism 34 exercise such cutoff in opposite directions, and that the control exercised by the faces of each prism is angularly disposed with relation to the cutoff exercised by the other prism faces. Thus, although each prism face has a cutoff angle which is identical to the cutoff angles of the other prism faces, such cutoff angles are displaced from each other along three angularly disposed axes. As a plurality of prisms 34, 38 and 42 are provided to form a plurality of rhombuses similar to rhombus *oanb*, all of which are displaced either longitudinally or laterally or both from each other, the overall brightness of panel 50 is substantially reduced along its entire length and width.

Although prisms 34 have heretofore been described as extending laterally between side portions 32 of panel 50, it is believed obvious that if desired the relative positions of prisms 34, 38 and 42 may be altered as desired and still retain the same overall geometric pattern. Thus, side portion 32 illustrates a plurality of elongated prisms 34′, 38′ and 42′, which are similar to the prisms 34, 38 and 42 previously described. However, to obtain the symmetrical alignment of the side portion 32 with the central portions 30, as shown in FIGS. 2 and 5, the base of the side prisms 34′, 38′ and 42′ have been made to equal the altitude of the center prisms 34, 38 and 42. This results in the side prisms being of a smaller size than the center prisms. It will be noted that the prisms 34′, 38′ and 42′ have all been angularly rotated the same number of degrees from the prisms 34, 38 and 42, respectively, in the center portion 30 of panel 50. Such angular rotation will obviously effect a change in the appearance of the panel when viewed from a given point. Side portion 32 also illustrates that the length of the outer edge line of each prism may be varied so as to vary the size of prisms which are utilized for light control purposes. Also, the distance the common apex, such as apex V, of three adjacent prisms 34′, 38′ and 42′ is located inwardly of panel 50, may be varied to change the angle the face of each prism 34′, 38′ and 42′ makes with the side 28 of the panel in the same manner the common apexes *g* to *m* of prisms 34, 38 and 42 may be varied. In actual practice it has been found advantageous to maintain the outer edge lines of prisms 34′, 38′ and 42′ in the same plane as the outer edge lines of prisms 34, 38 and 42 and to maintain the common apex V at a distance inward of panel 50 equal to the distance the apexes *g* to *m* extend inwardly of panel 50. Accordingly, the angle the faces of each prism 34′, 38′ and 42′ makes with the plane of the outer edge lines of the side portion 32 of panel 50 differs from the angle each face of each prism 34, 38 and 42 makes with the plane of the outer edge lines of the central portion 30 of panel 50. Such a change in the angle of the prism faces will in turn affect the cutoff angle of the prism.

Figure 6:
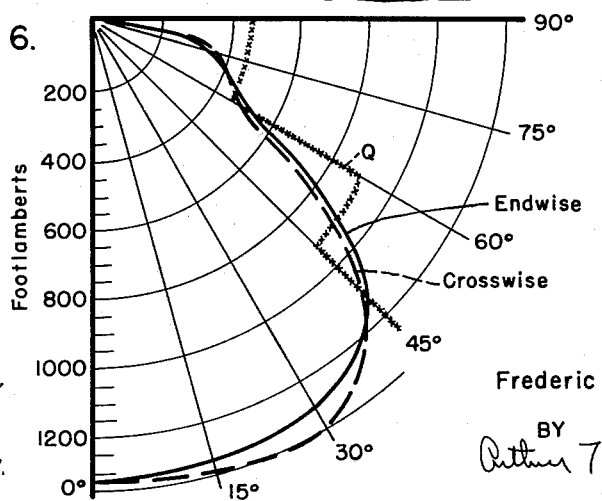
FIG. 6 is a photometric chart showing the light distribution from the lighting fixture shown in FIG. 1.

As has been indicated, each face of each prism controls the light rays so that only a few rays are transmitted outwardly of the panel 50 at high angles to the horizontal. As the various prisms extend angularly with relation to each other, such control will be obtained in two diametrically opposed directions on each of the axes that the prisms 34, 38 and 42 extend. FIG. 6 well illustrates the high degree of control obtained by a panel 50 when utilized by a luminaire similar to that shown in FIG. 1. Thus, when the light intensity in foot lamberts is measured for the endwise distribution of light, as shown by a solid line in FIG. 6, it will be noted that the maximum brightness is obtained directly below the panel 50 in the 0° to 30° zone, that the brightness level drops somewhat in the 30° to 45° zone, that the brightness level drops rapidly from approximately 1150 foot lamberts to 500 foot lamberts in the 45° to 60° zone, and that the brightness level drops from 500 foot lamberts to 0 foot lamberts in the 60° to 90° zone. FIG. 6 also indicates, by a dotted line, the crosswise distribution of the brightness level which is substantially identical to the endwise distribution except that slightly more light is transmitted in the 15° to 30° zone. It will particularly be noted that the light transmitted by the prismatic panel 50 substantially reduces the brightness in the 45° to 90° zone which is the angle at which light is normally visible within the peripheral field of vision with such a fixture, as shown in FIG. 1. Such decrease in brightness in this zone eliminates objectionable glare to the observers and prevents eye strain and fatigue. It will also be noted that the light distribution either normal or longitudinally with respect to the lamps is approximately the same.

The importance of such a distribution characteristic is illustrated by the standard value of maximum allowable brightness, indicated by the line Q in FIG. 6, established by the American Standard Practice for School Lighting for a controlled visual environment. Except for slight cutting of the corners at the transition levels of the standards, the brightness of a fixture utilizing the panel constructed in accordance with the principles of our invention is well within the prescribed limitation of such standard. It, of course, will be realized that it is impractical to obtain a brightness distribution which would define the exact curve indicated by the standard.

Thus, it will be noted by our construction that the lower surface of panel 50 is composed entirely of faces of prisms so that all light emitting from the light source is prismatically controlled by the panel 50. Also in view of the fact that the intersections of the prisms are all point intersections located inwardly of the panel, sharp corners may be provided without involving any safety hazard as would occur with extending pointed prisms. Also with projecting prisms, it is impossible to commercially provide a truly pointed prism. Such projecting prisms are usually slightly rounded at their outer ends which rounding produces a non-uniform light distribution or dazzling effect which is eliminated by our point intersections. Further, as our design is geometrically uniform, the size of the prisms and the prism faces may be reduced or enlarged, as desired, depending upon the overall degree of control which is desired.

A still further advantage of our construction lies in the fact that as the prism faces extend upwardly into the panel and the outer edges of the prisms are joined it is possible to employ a reduced thickness of material as the outer edges of the prisms will cross brace the panel, and the material between such cross bracing is eliminated. Such construction also materially reduces the weight of the panel required for such control purposes. From the lighting standpoint, another advantage of our construction lies in the fact that although a repetitive geometrically uniform pattern is employed in the lens, uniform light distribution is obtained, with a variety of lamp positions. A further important advantage of our construction is that lamp concealment at all angles below the panel 50 is obtained by the apparent surface diffusion caused by the overlapping design of prisms.

FIGS. 7 to 10 illustrate another modification of our invention comprising a two-part panel, each part of which was formed from any suitable material, such as methacrylate, as previously indicated. As shown, such modification comprises an elongated rectangular upper panel 80 and an elongated rectangular bottom panel 82 of the same size as panel 80. Each panel 80 and 82 is provided with an outwardly extending flange 84 and 86, respectively, at its outer edge, which are adapted to be seated on each other so as to form an elongated light control panel similar to the panel 50 previously described.

In order to facilitate the engagement of the flanges 84 and 86 with each other, flange 84 has been provided with a projection 88 which is seated within a groove 90 provided in the flange 86. Projection 88 and groove 90 are of such construction that the projection 88 may be forced into the groove 90 to obtain a dust and vapor seal. As described hereinafter, the inner surface of panel 80 facing panel 82 is provided with a prismatic structure for controlling the light transmission, and accordingly, the outer edges of flanges 84 and 86 are preferably sealed in any suitable manner for such material to prevent dirt entering between the panels 80 and 82 so as to decrease the efficiency of such prismatic structure.

As shown in FIG. 9, panel 80 is provided with a central section 92 having a section 94 at each of its sides. Central section 92 is provided with a plurality of parallel rows of elongated triangular prisms 96 which have their apex edges spaced outwardly from its lower surface, and which prisms 96 extend at a 45° angle to the side sections 94 in the first and third quadrants. Each side section 94 is provided with a plurality of parallel rows of elongated triangular prisms 98 which are similar to prisms 96 and which rows extend longitudinally between the ends of sections 94. In a similar manner, panel 82 is provided with a central section 100 and side sections 102 at each side of a central section 100. Central section 100 is provided with a plurality of parallel rows of elongated parallel prisms 104 depending from the emergent or lower surface thereof and which extend at an angle of approximately 45° in the second and fourth quadrants between the sides of central section 100. Side sections 102 are also provided with a plurality of rows of prisms 106 similar to prisms 104 and which rows extend laterally between the sides of side sections 102.

When panel 80 is assembled to panel 82, as indicated, the rows of prisms 96 in panel 80 extend in opposite quadrants to prisms 104 in panel 82 so that the assembled panel when viewed from below will appear to intersect the rows of prisms 104 in panel 82 at right angles to form square prismatic areas. Although, as shown, the spacing of the rows of prisms 96 and 104 is the same whereby square areas are provided by the apparent intersection of the parallel rows of prisms, it is to be realized that, if desired, one set of prisms may be spaced a greater distance apart than the other so as to provide rectangular areas. As shown, prisms 96 will initially transmit light in the manner as has been previously described so that rays at high angles to the horizontal at the sides of the prisms 96 will be cut off. Prisms 96 also determine the light rays which will impinge upon panel 82, in the manner as previously indicated. Prism 104 on panel 82 will, in turn, determine which light rays will be transmitted outwardly from the composite panel. Prisms 104 will also cutoff light rays at high angles to the horizontal at each of the sides of the prisms 104. As the prisms 96 and 104 are at right angles to each other such cutoff will occur along four principal axes so that the endwise and crosswise distribution of the composite panel will be substantially the same as that previously described. Similarly, the prisms 98 and 106 on the end portions 94 and 102, respectively, will exercise the same type of cutoff in that region of the panel. Thus, it will be noted that, if desired, one part of the control function of the panel can be placed upon one panel and the other control function placed upon another part of the panel. Such a procedure permits simplified manufacturing of the individual panels and thereafter the individual components may be assembled to obtain the low brightness distribution as previously defined. Also, having described particular geometric configurations with regard to light panels constructed in accordance with the principles of our invention, it is obvious that, if desired, other geometric configurations having at least three closed sides could be similarly employed for such purposes.

Having described preferred embodiments of our invention in accordance with the patent statutes, it is desired that our invention be not limited to the specific constructions illustrated as it will be apparent that other modifications may be made without departing from the broad spirit and scope of our invention. Accordingly, it is desired that this invention be interpreted as broadly as possible and that it be limited only as required by the prior art.

We claim as our invention:

A refractor adapted for use with an elongated light source comprising a flat elongated panel of light transmitting material, a plane surface on one side of said panel, a plurality of prisms on the other side of said panel the outer edges of said prisms being located in a common plane substantially parallel to the said one side of said panel, said prisms being disposed in a pattern having the outer edges of three adjacent prisms located to form an equilateral triangle, each outer edge of each said adjacent prisms also forming a side of other equilateral triangles, respectively, each prism of each said equilateral triangle having a side thereof extending depthwise into said material and inwardly of said equilateral triangle to a common point, each said side forming an isosceles triangle including an outer edge of each said prism and each said side being located at such an angle that said panel serves as a refractor, said panel divided into a central portion and opposite side portions, said central portion comprising spaced parallel rows of said prisms, said side portions comprising spaced parallel rows of said prisms with said parallel rows of the latter prisms extending angularly with respect to the corresponding parallel rows of prisms of said central portion, and the prisms of each of said side portions being of a size smaller than said central portion prisms so that said central portion is adapted to control the brightness of said light source in one direction and said side portions are adapted to control brightness of said light source in other directions.

References Cited in the file of this patent

UNITED STATES PATENTS

| | | |
|---|---|---|
| 458,850 | Jacobs | Sept. 1, 1891 |
| 1,241,886 | Rowe | Oct. 2, 1917 |
| 1,941,079 | Exelmans | Dec. 26, 1933 |
| 1,950,560 | Martinek et al. | Mar. 13, 1934 |
| 2,017,075 | Rolph et al. | Oct. 15, 1935 |
| 2,269,554 | Rolph | Jan. 13, 1942 |
| 2,283,010 | Logan et al. | May 12, 1942 |
| 2,474,317 | McPhail | June 28, 1949 |
| 2,486,558 | Franck | Nov. 1, 1949 |